US012758928B1

(12) United States Patent
Burchett

(10) Patent No.: US 12,758,928 B1
(45) Date of Patent: Oct. 13, 2026

(54) TOROIDAL DRAG-RING FLUID MIXING CONTROL SYSTEM

(71) Applicant: Shannon Burl Burchett, Plano, TX (US)

(72) Inventor: Shannon Burl Burchett, Plano, TX (US)

( * ) Notice: Subject to any disclaimer, the term of this patent is extended or adjusted under 35 U.S.C. 154(b) by 0 days.

(21) Appl. No.: 19/534,076

(22) Filed: Feb. 9, 2026

Related U.S. Application Data

(60) Provisional application No. 63/957,622, filed on Jan. 9, 2026.

(51) Int. Cl.
*B01F 33/25* (2022.01)
*B01F 33/501* (2022.01)

(52) U.S. Cl.
CPC ........ *B01F 33/25* (2022.01); *B01F 33/50111* (2022.01)

(58) Field of Classification Search
CPC .... B01F 33/25; B01F 33/452; B01F 33/5011; B01F 33/50111; F15D 1/009
See application file for complete search history.

(56) References Cited

U.S. PATENT DOCUMENTS

| | | | | | |
|---|---|---|---|---|---|
| 3,570,819 | A * | 3/1971 | Rosinger | B01F 33/452 366/302 |
| 6,007,237 | A * | 12/1999 | Latto | F15D 1/00 366/315 |
| 10,350,561 | B1 * | 7/2019 | Dushine | B01F 33/452 |
| 10,588,463 | B2 * | 3/2020 | Enghard | B01F 33/253 |
| 11,014,059 | B2 * | 5/2021 | Sun | B01F 33/25 |

* cited by examiner

*Primary Examiner* — Elizabeth Insler

(57) ABSTRACT

A toroidal drag-ring fluid mixing system is disclosed for mixing viscous or particulate fluids within bounded containers across diverse chemical, diagnostic, and material formulations. The toroidal drag-ring is dimensioned relative to container geometry and, in some embodiments, fluid properties including density and viscosity, such that agitation induces repeatable and statistically reproducible boundary-layer separation and separation-induced shear turbulence within the container. The annular geometry promotes vortex shedding and chaotic advection to disrupt laminar dead-zones and resuspend settled particulates, while maintaining a substantially continuous exterior free of fluid-retaining cavities to avoid obstruction of internal valves or dip-tubes.

22 Claims, 12 Drawing Sheets

TOROIDAL DRAG-RING FLUID MIXING CONTROL SYSTEM

PRIORITY CLAIM

This application claims the benefit of U.S. Provisional Patent Application No. 63/957,622, filed Jan. 9, 2026, the entire contents of which are hereby incorporated by reference.

FIELD OF THE INVENTION

The present invention relates to rigid toroidal drag-ring systems for turbulence-optimized mixing of viscous fluids in bounded containers.

BACKGROUND OF THE INVENTION

Systems requiring shear turbulence in viscous fluids traditionally rely on spherical balls for mixing agitation inside containers. While the governing physics of fluid dynamics are well established, current mechanical implementations exhibit practical limitations. In pressurized canisters, spherical agitator balls do not reliably scale drag or turbulence predictably with container width, volume, or viscosity, often resulting in inadequate shear-trip, pigment-settling dead-zones, uncontrolled tumble states, residue traps, and cavitation nucleation that destabilizes mixing wakes, as schematically illustrated in FIG. 5. Accordingly, there remains a need for a form-rigid, separation-dominant toroidal agitation system that scales with operational environment, responds to agitation and enforces wake turbulence without fluid-retaining voids, which the present invention addresses.

PRIOR ART COMPARISON

Existing fluid mixing systems rely primarily on spherical agitators. These approaches, while widely studied and patented, differ materially from the rigid, mass-biased, cavity-free toroidal agitation system disclosed herein.

The closest known art generally falls into the following category: spherical mixing media, such as glass or metal agitator balls used in aerosol canisters. None of these references, individually or in combination, disclose or suggest the following novel characteristics of the present invention:

A rigid toroidal body serving as a mixing turbulence generator,

Repeatable boundary-layer separation contours integrated into the torus cross-section to generate separation-dominant form drag, not roughness-driven skin friction alone, Keel-weighted or radially balanced mass biasing inside a torus to stabilize attitude during container agitation, and Cavity-free perimeter turbulence-induction features (e.g., tabs or micro-flats) that shed vortices without trapping fluid, increasing clog risk, or promoting cavitation nucleation.

The distinctions between conventional spherical agitator systems and the present rigid toroidal drag-ring system are summarized in Table 1 for comparative reference. None of the cited approaches recognize or exploit annular boundary-layer separation as a primary turbulence-generation mechanism in bounded containers.

TABLE 1

Closest Prior Art Compared to Toroidal Mixing Drag-Ring

| Closest Known Art (Existing) | Characteristics of the Present Invention |
|---|---|
| Aerosol canisters with spherical mixing media (glass/steel agitator balls) | Rigid toroidal body serving as mixing turbulence generator |
| Spherical media governed by tumble/descent state with unpredictable mixing and “ball rattle” noise | Repeatable boundary-layer separation contours integrated into torus cross-section |
| | Generates separation-dominant form drag, not roughness-driven skin friction alone |
| Mass-balanced in any rolling direction, unfavorably tumbles and clogs dip-tubes | Keel-weighted or radially balanced mass biasing inside torus to stabilize attitude during container agitation |
| | Cylinder-normal presentation inhibits clogs and noise |
| Smooth surface resists boundary-layer trip and creates cavitation nucleation wakes | Cavity-free perimeter turbulence-induction features shed vortices without trapping |
| | Tabs or micro-flats inject form drag with vortex shedding, safely preventing clog risk |
| Surface topology | Continuous, cavity-free exterior during rotation |

Unlike the above prior art, the present system establishes rigid toroidal rings as primary fluid agitation structures, enabling mixing-efficient turbulence.

Accordingly, the invention represents a non-contradictory and non-obvious improvement over spheres.

BRIEF SUMMARY OF THE INVENTION

The present invention discloses a rigid toroidal drag-ring system engineered to induce controlled shear turbulence, including but not limited to separation-induced shear turbulence, for fluid mixing within bounded containers containing viscous liquids or suspensions. The disclosed system applies broadly to any bounded fluid reservoir, including but not limited to aerosol canisters. The system operates in the mode of mixing-optimized agitation within bounded containers containing viscous liquids or suspensions. Rigid refers to structures that maintain geometric form sufficient to preserve separation-induced mixing behavior during agitation under expected mixing loads, including semi-rigid or composite materials exhibiting functional rigidity. Tuning dependencies governing mixing mode turbulence induction are summarized in Table 2, including container-scaled Reynolds shear-trip behavior. The system is applicable to any fluid mixing scenario involving laminar disruption or viscous resuspension within a bounded container, independent of pressurization, container volume, or fluid composition.

The rigid toroidal drag-ring geometry can be configured for optional mounting to a powered rotational shaft, submersible mixing probe, or motor-driven clamp-adjacent drive system, such that when rotational torque is applied by an electric or mechanical motor driver, the torus induces symmetric boundary-layer separation to generate shear turbulence for fluid mixing in open or closed containers, without forming fluid-retaining cavities that increase clogging or particulate obstruction risk.

In mixing, a monolithic or structurally segmented rigid torus is dimensioned relative to container internal width, fluid density, and viscosity, enabling repeatable, predictable boundary-layer separation and Reynolds shear-trip turbulence that disrupts laminar dead-zones and increases pigment or particulate resuspension through chaotic advection and symmetric vortex sweep, without dip-tube obstruction or clog risk.

Preferred embodiments incorporate optional CFD-based turbulence and mixing verification workflows prior to manufacture, enabling a person having ordinary skill in the art (PHOSITA) to construct and use the system without requiring physical prototypes. Computational Fluid Dynamics (CFD) modeling or empirical prototyping may be employed to evaluate or optimize mixing performance, although neither is required to practice the invention.

The disclosed toroidal drag-ring system therefore provides a manufacturable, rigid, compact, shear turbulence architecture distinct from spherical agitators, offering high-cycle durability, and predictable internal mixing turbulence.

Definitions

The following terms are provided for clarity and enablement of the disclosed toroidal drag-ring system and its mixing embodiments. The definitions are provided to promote clarity and do not limit the scope of the Claims except to the extent expressly recited therein.

Aerosol Canister—A pressurized fluid container used to dispense paint, coatings, adhesives, or other viscous formulations via a valve and dip-tube, and capable of being manually shaken to mix internal contents.

Annulus/Annular Ring—A ring-shaped geometry sharing a central void; includes toroidal forms and D-section variants.

Attitude Stability—Resistance to torus tumbling into a tip-up or off-axis tumble state during mixing; achieved through mass-moment biasing or radial inertial balancing. As used herein, the terms "keel-weighted mass biasing," "radially balanced mass biasing," "mass-moment biasing," and "inertial biasing" refer to related techniques for intentionally distributing mass within the toroidal drag-ring to influence its dynamic orientation during agitation, without mechanically constraining translational or rotational motion.

Boundary-Layer Separation—A flow regime transition in which fluid moving over a solid surface detaches from the surface, forming a wake and shedding vortices, creating separation-induced shear and turbulence.

Wake Structures—As used herein, "wake structures" refers to regions of separated, recirculating, or shear-dominated flow downstream of a moving body within a fluid volume, including but not limited to axial wake regions, recirculation zones, and wall-interacting wake regions.

Cavitation Nucleation—Formation of vapor cavities or bubbles in a fluid caused by local pressure drops; minimized by cavity-free torus design and wake stability controls.

Chaotic Advection—Multi-axis tumble mixing behavior of a torus moving through viscous fluid, enhancing pigment sweep, floc breakup, and turbulence without net drag maximization.

CFD (Computational Fluid Dynamics)—Numerical modeling workflows (finite-volume or lattice-Boltzmann solvers) used to evaluate torus drag contours, turbulence modes, and wake symmetry prior to manufacture; not proof of prototype.

$D_c$ (Container Characteristic Width)—The governing internal diameter or shortest mixing cross-section of a bounded container or canister.

Dynamic Resuspension Zone—Internal container region where torus agitation induces bounded turbulence to prevent pigment settling or dead-zone laminar flow.

Dip-Tube—A rigid internal straw or conduit in a pressurized spray can that draws fluid from the canister base toward the valve. This spray can fluid intake tube must remain unobstructed, and this requirement therefore informs torus OD-to-thickness scaling in mixing mode.

Inner Opening Diameter ($ID_t$)—The unobstructed internal diameter of a torus ring, selected to be ≥60% of Outer Diameter ($OD_t$) in preferred embodiments to avoid residue retention or dip-tube obstruction.

$M_t$(Inertial Mass-Moment Bias)—An effective inertial mass-moment of the toroidal body accounting for mass distribution and resistance to angular acceleration under agitation.

Miniaturized Torus—A toroidal agitator ring embodiment having an $OD_t \leq 45$ millimeters for aerosol canister agitation, configured to maintain tumbling freedom and avoid jamming.

$OD_t$ (Torus Outer Diameter)—The maximum external diameter of the toroidal drag-ring measured across its widest cross-section.

$\rho_f$ (Fluid Density)—Mass per unit volume of the fluid medium interacting with the torus during mixing.

PHOSITA—"Person Having Ordinary Skill In The Art"; the hypothetical skilled engineer who should be able to construct and operate the invention from this disclosure without undue experimentation.

Reynolds Number (Re)—A dimensionless parameter quantifying flow regime based on size×velocity/viscosity; governs transition to turbulence and wake behavior. This parameter describes inertial vs. viscous dominance in a fluid stream interacting in this case with the torus.

Reynolds Shear-Trip Regime—An internal container mixing mode in which torus geometry induces shear layers that destabilize laminar flow to increase bounded turbulence.

Separation-Contoured Agitation Body-A non-streamlined solid structure such as a D-section or non-planar toroidal profile that is intentionally shaped to promote boundary-layer flow separation along an annular separation arc (hereinafter, the "separation arc") to increase separation-induced shear and wake turbulence during agitation within a bounded fluid volume.

Predetermined Circumferential Location—As used herein, a "predetermined circumferential location" refers to a separation location that is fixed by the geometry of the annular cross-section and surface contour of the toroidal drag-ring, rather than by user selection, orientation, or operational adjustment.

Separation-Induced Shear—Shear and turbulence generated by pressure differentials arising from boundary-layer separation within a bounded fluid reservoir during agitation.

Torus/Toroidal Body—A rigid, axis-symmetric or non-axis-symmetric, cavity-free donut-shaped ring characterized by a closed circular centerline and a continuous or functionally continuous exterior surface, the toroidal body defining a central opening through which fluid may pass during agitation, including discontinuous annular bodies that functionally define a central opening and preserve annular flow separation behavior, provided that such bodies generate separation-induced shear turbulence as described herein.

Torus Thickness ($T_t$)—The cross-sectional material thickness of the rigid torus ring measured orthogonally from its circular centerline.

$V_c$ (Container Volume)—The total internal fluid volume enclosed within a bounded mixing reservoir.

Valve-Clear Geometry—Torus ring design free of cavities or recesses that trap fluid or residue, minimizing clog risk.

Viscosity (μ)—A measure of a fluid's internal resistance to shear or flow, influencing torus mass-moment and size-scaling in mixing mode.

TABLE 2

Mixing Design Parameter for Rigid Toroidal Drag-Ring for Select Defined Terms

| Parameter | Symbol | Preferred Range or Description | Mixing Function |
|---|---|---|---|
| Container characteristic width | $D_c$ | Internal diameter or shortest internal cross-section of bounded container | Governs torus outer diameter scaling for effective turbulence generation |
| Container volume | $V_c$ | Total internal fluid volume | Influences inertial response and chaotic advection behavior |
| Fluid density | $\rho_f$ | Density of viscous fluid or suspension | Affects mass-moment biasing and shear-generation efficiency |
| Fluid viscosity | μ | Dynamic viscosity of fluid | Determines Reynolds shear-trip regime and mixing effectiveness |
| Torus outer diameter | $OD_t$ | $0.10\ D_c \le OD_t \le D_c$ [a] (non-limiting geometric envelope) | Sets projected separation area for shear turbulence |
| Torus thickness | $T_t$ | Selected to preserve rigidity and dip-tube clearance | Maintains structural integrity and avoids clogging |
| Inner opening diameter | $ID_t$ | ≥60% of $OD_t$ | Prevents residue retention and obstruction |
| Separation depth | f | 4% to 12% of $T_t$ | Promotes repeatable boundary-layer separation and vortex shedding |
| OD-to-thickness ratio | $OD_t$:$T_t$ ratio | 6.0:1 to 12.5:1 | Balances turbulence generation with free mobility |
| Mass-moment bias | $M_t$ | Internal keel-weight or inertial biasing | Stabilizes broadside presentation during agitation |
| Reynolds number (mixing regime) | Re | $2{,}000 \le Re \le 40{,}000$ [b] | Ensures shear-dominant turbulence within bounded container |
| Surface topology | — | Continuous, cavity-free exterior | Prevents fluid entrapment, clogging, and cavitation nucleation |

[a] $OD_t$ denotes scalable relative to $D_c$, including small-diameter toroidal bodies comparable in projected scale to spherical agitators

[b] In representative embodiments. These stated Reynolds number ranges are illustrative of representative mixing regimes and do not define minimum or maximum operability.

Terms used in the singular shall also include the plural unless context dictates otherwise. These Reynolds number values are exemplary and non-limiting, and mixing may occur outside the stated range depending on fluid properties, agitation energy, and container geometry. The term 'cavity-free' refers to the absence of functional recesses that materially retain fluid or particulates and does not exclude incidental manufacturing tolerances or surface microstructures. As used herein, 'toroidal' includes annular, quasi-toroidal, segmented, non-circular, and non-axis-symmetric ring bodies that functionally generate separation-induced shear turbulence. As used herein, 'toroidal' further includes continuous or discontinuous looped forms having a central opening and an exterior surface configured to promote circumferential flow separation, irrespective of perfect geometric symmetry. As used herein, the singular forms "a," "an," and "the" include plural referents unless the context clearly dictates otherwise. The terms "comprising," "including," and "having" are inclusive and therefore specify the presence of stated features, integers, steps, or components, but do not preclude the presence or addition of one or more other features, integers, steps, components, or groups thereof. The term "configured to" is used herein to denote structure that is arranged, constructed, or designed to perform a specified function, and does not imply that such function must be actively performed at all times. As used herein, the phrase 'including but not limited to' is indicative of an exemplary and non-exhaustive listing of elements or features. Use of the terms 'may,' 'can,' or 'in some embodiments' indicates optional features and does not imply that such features are required in all embodiments unless expressly recited in the claims. No embodiment, figure, or example herein is intended to limit claim scope unless expressly recited in the claims.

BRIEF DESCRIPTION OF THE DRAWINGS

In the drawings, like reference numerals refer to identical elements throughout the several views. The drawings illustrate exemplary embodiments and, together with the description, serve to explain the principles of the invention. The figures are not drawn to scale and are intended to illustrate representative embodiments and flow behaviors. All flow lines and wake structures illustrated in the figures are schematic and representative, not limiting.

In the right-hand portion of the figure, the toroidal drag-ring (20) is shown in an unbounded or weakly bounded environment lacking sufficient confinement to sustain wake recirculation and shear interaction within the operative mixing volume, wherein downstream wake structures (91) are free to expand, disperse, or drift away from the mixing body. In such unbounded wake conditions, shear interaction diminishes with distance, reducing the effectiveness of mixing within unconfined or insufficiently confined volumes despite continued motion of the toroidal drag-ring.

Figure 8:
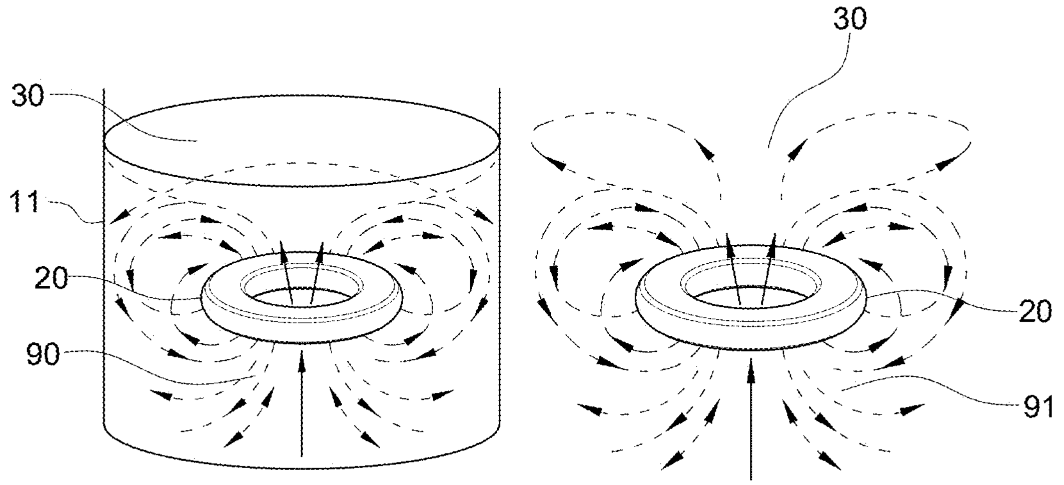
FIG. 8 schematically illustrates a comparative representation of bounded versus unbounded wake behavior associated with a toroidal drag-ring (20) moving through fluid (30). In the left-hand portion of the figure, the toroidal drag-ring (20) is shown operating within a bounded container (11), wherein downstream wake structures (90) generated by separation-induced shear remain spatially constrained by the container boundaries such that wake energy, recirculation, and shear interaction are retained within the fluid volume over successive agitation cycles. In this bounded configuration, the wake envelope remains generally aligned with the direction of motion and exhibits repeatable recirculation and shear-layer interaction that promotes redistribution and mixing within the confined fluid volume. In such bounded configurations, mixing arises primarily from wake-mediated shear interaction rather than from bulk translational displacement of the fluid. As used herein, bounded wake behavior does not require a sealed, rigid, or pressurized container and instead refers to functional confinement sufficient to cause repeated wake-boundary interaction within the operative mixing volume.

As shown schematically in both configurations, fluid may additionally pass through the central opening of the toroidal drag-ring, contributing to entrainment and shear interaction with the downstream wake without constituting a primary jet, nozzle, or bulk-pumping effect. The flow features illustrated in FIG. 8 are conceptual and representative of functional wake behavior arising from confinement conditions, and are not intended to depict precise velocity magnitudes, fixed flow boundaries, or limiting operating conditions.

DETAILED DESCRIPTION OF THE INVENTION

Figure 1:
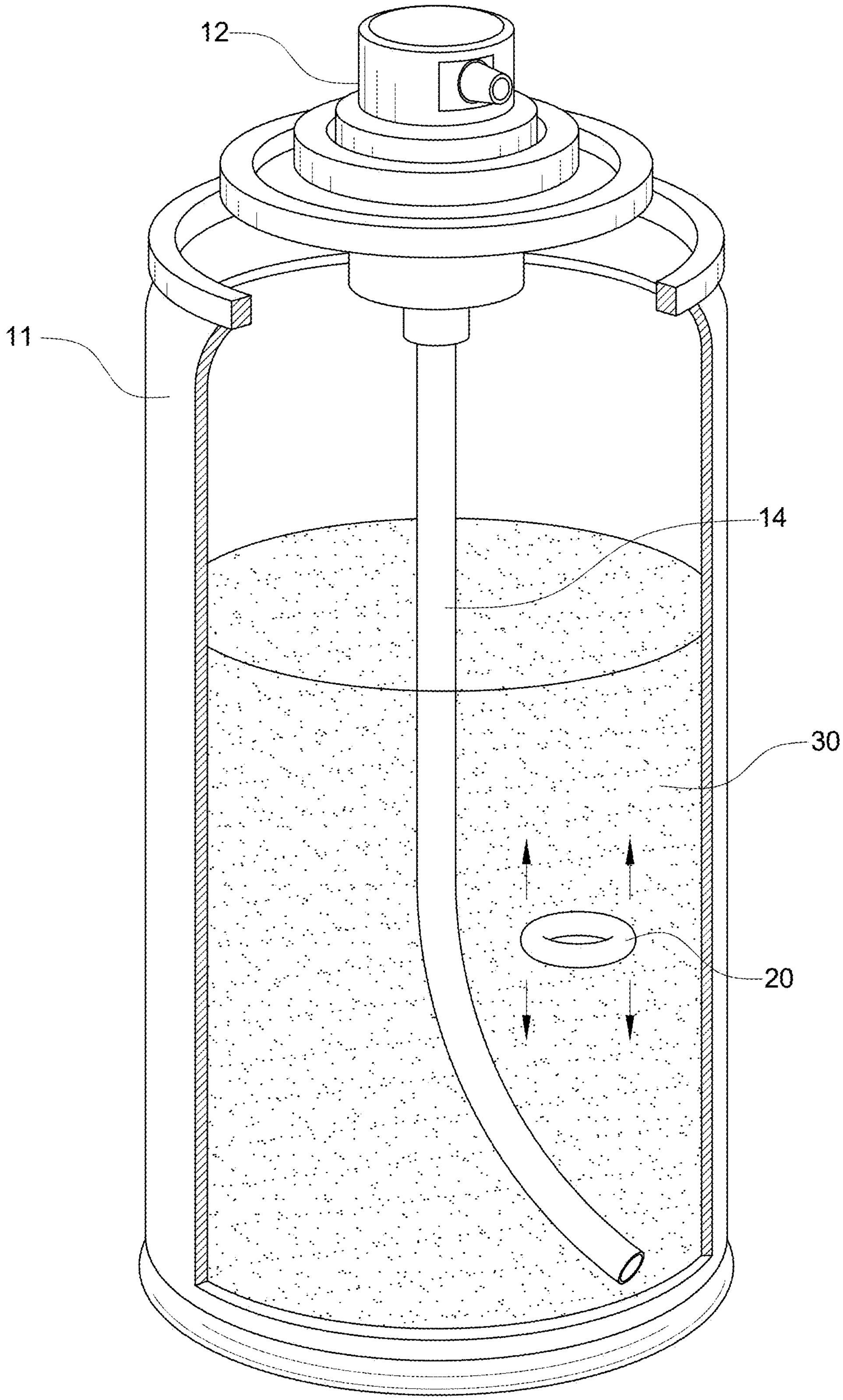
FIG. 1 illustrates a bounded fluid container (11) enclosing a viscous fluid (30) reservoir and a freely mobile rigid toroidal drag-ring (20) positioned for agitation-based mixing, wherein manual shaking of the container causes the toroidal drag-ring to tumble through the fluid volume and induce separation-induced shear turbulence without obstructing a valve (12) or dip-tube (14) inlet.

The invention discloses a rigid toroidal agitation system configured for operation in bounded viscous reservoirs for fluid (30) mixing, as illustrated in FIG. 1.

Although described herein primarily in the context of aerosol containers for purposes of illustration, the toroidal drag-ring and associated mixing principles disclosed are not limited to aerosol systems. The toroidal drag-ring may be employed in any bounded fluid system in which enhanced mixing is desired, including but not limited to pressurized or unpressurized containers, reservoirs, reactors, coolant loops, fuel or chemical storage vessels, medical or laboratory fluid systems, and other enclosed fluid environments. The specific embodiments and figures described herein are exemplary and are not intended to limit the scope of the invention as defined by the claims.

Toroidal Design

The toroidal drag-ring (20) may be implemented in one or more of the following embodiments:

Mixing-Efficient Agitation Torus ("Agitation Torus")—optimized for turbulence generation, shear layer formation, vortex shedding (24), and chaotic volumetric sweep within a bounded viscous fluid (30) reservoir, while preserving mobility and minimizing obstruction or clog risk. For avoidance of doubt, the toroidal drag-ring of the present invention is not a sealing element, gasket, or bearing, but rather a freely mobile agitation body intended solely to generate internal turbulence within a bounded fluid container (11). In its primary mixing embodiments, the toroidal drag-ring is not fixed, mounted, tethered, pinned, shaft-supported, or rotationally constrained relative to the container, and is configured to translate and rotate freely within the bounded fluid volume during agitation. In its primary embodiments, the toroidal drag-ring is not rotationally constrained, is not load-bearing, and is not concentric with or mounted on a shaft or axle. For purposes of this disclosure, the terms 'Agitation Torus,' 'mixing torus,' and 'toroidal drag-ring' refer to the same structural element operating in a fluid-mixing mode. Agitation may be manual, mechanical, vibrational, rotational, acoustic, or inertial in nature. While axis-symmetric embodiments are illustrated for clarity, the invention expressly contemplates toroidal drag-rings having asymmetric mass distribution, surface topology, or geometric perturbations that preserve separation-induced shear mixing. The disclosed features may be combined in any technically compatible manner.

The system therefore tunes shear-generation behavior for maximization of turbulence.

Mixing drag ratios are tuned to favor Reynolds shear-trip regimes within the container, for container-bound shear optimization.

Additionally, clarification is as follows: mixing via separation-induced turbulence within a bounded container emphasizes pigment advection, vortical shedding, and shear-trip advection, rather than fine-scale roughness-driven shear alone.

Mixing-Efficient Agitation Torus Embodiments

Figure 3A:
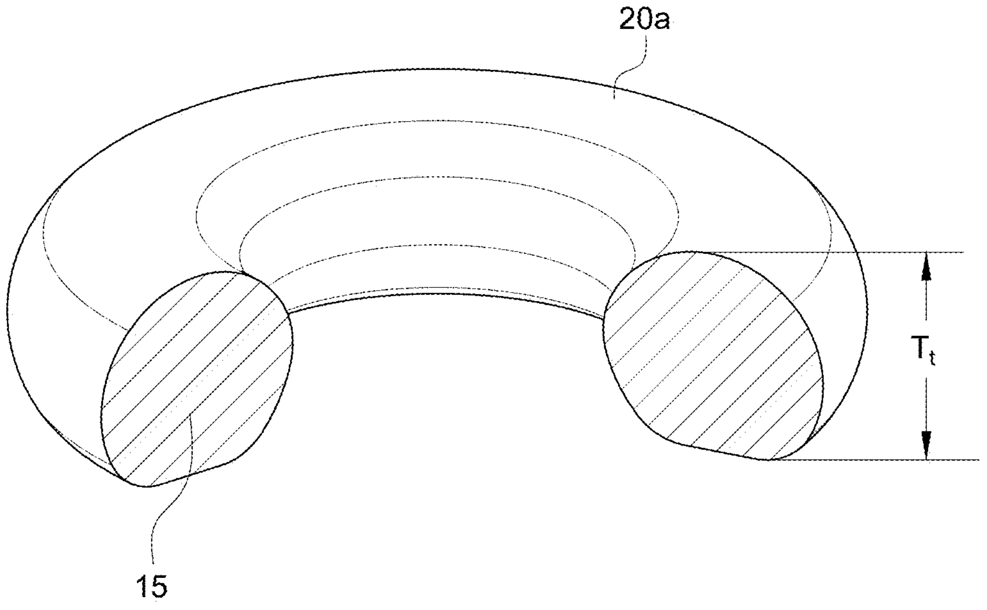
FIG. 3A illustrates a representative cross-sectional profile of a toroidal drag-ring (20*a*) having a bluff D-section profile (15). The bluff D-section profile includes a generally flat or minimally curved forward-facing separation surface and a trailing curvature configured to promote repeatable boundary-layer separation as the toroidal drag-ring moves through a bounded fluid reservoir. In representative embodiments, the separation depth of the bluff D-section profile is between approximately 4 percent and 12 percent of the torus thickness (Tt). This geometry is configured to induce separation-dominant shear turbulence and vortex shedding within the surrounding fluid while maintaining a substantially cavity-free exterior surface that avoids fluid retention or clogging.
Figure 3B:
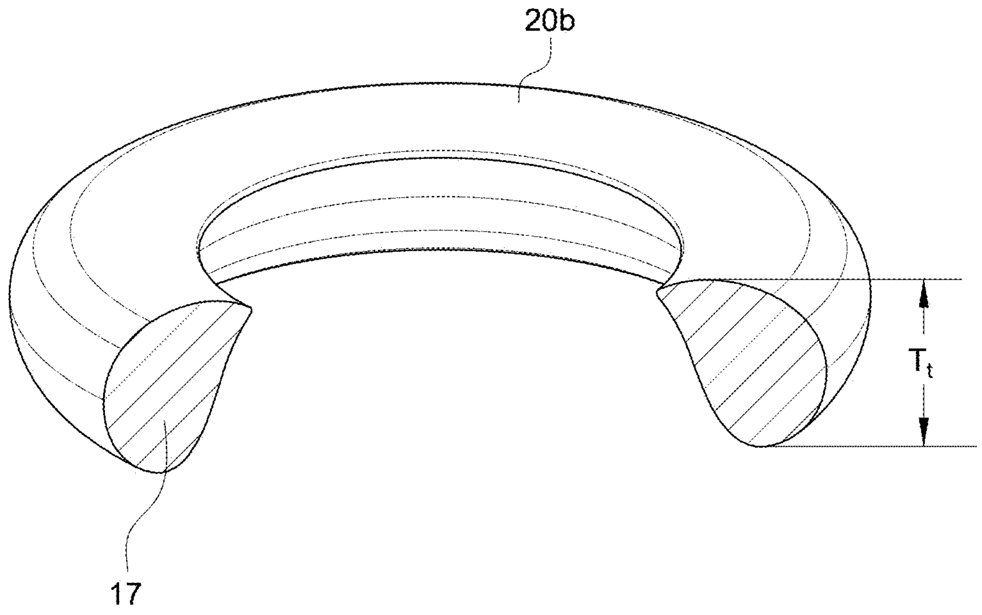
FIG. 3B illustrates a representative cross-sectional profile of a toroidal drag-ring (20*b*) having a cambered separation-contoured profile (17). The cambered separation-contoured profile includes a smoothly curved leading surface and a downstream separation contour configured to initiate controlled boundary-layer detachment during movement of the toroidal drag-ring through a bounded fluid reservoir. In representative embodiments, the separation contour produces an effective separation depth between approximately 4 percent and 12 percent of the torus thickness (Tt), thereby generating repeatable shear turbulence and wake formation while maintaining a substantially cavity-free exterior surface. The cambered profile further reduces sensitivity to orientation and promotes consistent separation behavior across a range of Reynolds numbers.

In mixing applications, the Agitation Torus provides an alternative to spherical agitation media (e.g., glass or metal mixing balls) by employing a non-spherical projected drag surface capable of interacting with viscous fluids through:

- Localized vortex shedding and shear layers generated by bluff or separation-contoured torus cross-sections, as illustrated, for example, in FIG. 3A and FIG. 3B;
- Tumbling chaotic sweep within the fluid volume to maximize mixing yield per agitation cycle;
- High mobility transitions through the reservoir, avoiding static anchor states;
- Cavity-free surface trips (e.g., tabs, micro-flats, or ribs) that induce turbulence without trapping fluid; and
- Keel-weighted mass biasing or internal rails that promote repeatable broadside presentation to the fluid during inter-shake dwell periods, without locking the torus in a static orientation.

Preferred cross-section classes for the Agitation Torus include:

- Bluff D-sections (15) with a flat depth between 4% to 12% of torus thickness, as illustrated in FIG. 3A and FIG. 3B; or
- Cambered separation-contours (17) (convex leading-face, flat trailing face) that induce flow detachment sufficient to resuspend pigments. Other cross-sectional profiles capable of inducing boundary-layer separation (22) are contemplated, including polygonal, asymmetric, or biomimetic contours.

Figure 2:
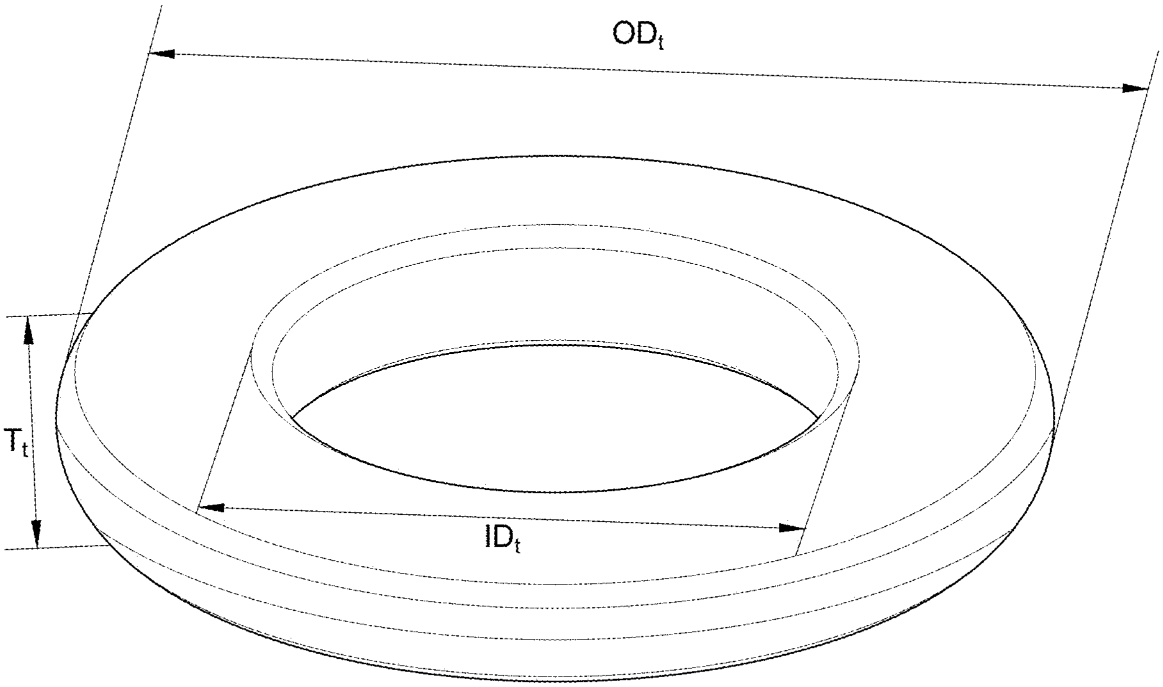
FIG. 2 illustrates a perspective view of a rigid, axis-symmetric toroidal drag-ring (20) having a continuous exterior surface free of fluid-retaining cavities, the torus defining an outer diameter ($OD_1$), an inner opening diameter ($ID_r$), and a torus thickness ($T_t$), and configured to remain rigid and freely mobile during agitation.

Outer diameter-to-thickness ratios are selected between 6.0:1 and 12.5:1, with thickness normalized to container constraints to ensure dip-tube (14) and valve (12) clearance, preventing clogging or interference, as illustrated in FIG. 2.

In preferred spray can mixing modes, the torus orientation may be governed by a gravity-biased keel insert or inertial moment biasing positioned at or near the internal broadside plane, to ensure the ring rotates through high-shear attitude states under container shaking and avoids tip-up orientations that reduce mobility or risk fouling the dip-tube inlet.

The Agitation Torus may further include chemical-tolerant polymer or metal classes suitable for paint canisters, primers, lubricants, sealants, and viscous industrial suspensions. To maintain orientation authority, the ring may incorporate one or more of the following stabilization mechanisms:

1. Keel-weighted or mass-biased moment distribution embedded in the torus interior to favor repeatable axis-aligned drag presentation during inter-shake or inter-maneuver dwell periods;
2. Radially balanced inertial biasing to discourage tip-up tumble states; and
3. Cavity-free perimeter trip tabs or micro-flats that avoid fluid entrapment or residue retention.

Accordingly, the disclosed torus embodiments provide a manufacturable and non-obvious improvement over spherical agitation.

Materials and Construction Embodiments

In preferred embodiments, the toroidal drag-ring is manufactured as a rigid, cavity-free torus or annular separation body formed from materials selected for fluid compatibility, durability under repeated agitation cycles, corrosion resistance, and manufacturability.

Suitable material classes include:

1. Metals and Alloys—stainless steels including AISI 304 and AISI 316, nickel-based alloys, titanium alloys, and aluminum alloys, selected for chemical inertness with paints and coatings, high mechanical toughness, and marine-grade corrosion resistance.
2. Polymers and Elastomers (Rigid, Formable Grades)—chemically tolerant thermoplastics and engineering polymers, including acetal, nylon (PA6/PA12), polypropylene, Acrylonitrile Butadiene Styrene (ABS), polycarbonate, Polyether Ether Ketone (PEEK), Polytetrafluoroethylene (PTFE)-blended rigid composites, and solvent-resistant polymer blends, wherein rigidity is maintained through ring thickness and material modulus rather than through flexible membranes, and wherein material selection is influenced by desired traits including free tumbling in viscous fluids, resistance to solvents, maintenance of precise geometry, and avoidance of clogging or sticking.
3. Surface Coatings and Treatments—exterior surfaces may incorporate anodization, hydrophobic coatings, ceramic glazing, electroless nickel, oxide passivation, or anti-biofouling thin films, provided such coatings do not introduce cavities, pits, or fluid-retaining recesses that increase clog risk, residue adhesion, or cavitation nucleation.
4. Manufacturing Techniques—the ring may be fabricated via isostatic pressing, die forming, precision injection molding, metal sintering, additive manufacturing (3D printing), or Computer Numerical Control (CNC) machining, so long as the final torus geometry remains rigid, void-free, and cavity-free. All materials are selected to remain rigid under expected mixing temperatures and solvent exposures.

By way of example, toroidal drag-rings for consumer aerosol paint cans may be fabricated from acetal, nylon, polypropylene, or 304 stainless steel.

Geometric tolerances are selected such that mixing rings maintain sufficient thickness and modulus to tumble freely through viscous media while shedding pigment-resuspending vortices. The ring density, thickness, and interior mass distribution may be selected to accommodate keel-weight inserts or radially balanced inertial biasing (claimed separately), but the torus structure itself remains monolithic or segment-solid, not hollow or cavity-laden. In further embodiments, materials may be selected from food-grade or pharmaceutical-grade polymers when the invention is applied to consumable or sensitive fluid formulations.

Accordingly, the disclosed toroidal drag-ring may be manufactured from rigid materials tolerant of high-cycle mixing and represents a distinct and manufacturable improvement over spherical mixing balls.

Actuation and Orientation Control Systems

Actuation mechanisms may include the following rigid agitation class: Mechanical shake-interpreting inertial struts or floating carriage mounts used in bounded reservoirs (e.g., aerosol canisters) that induce torus motion relative to container agitation vectors.

Figure 6A:
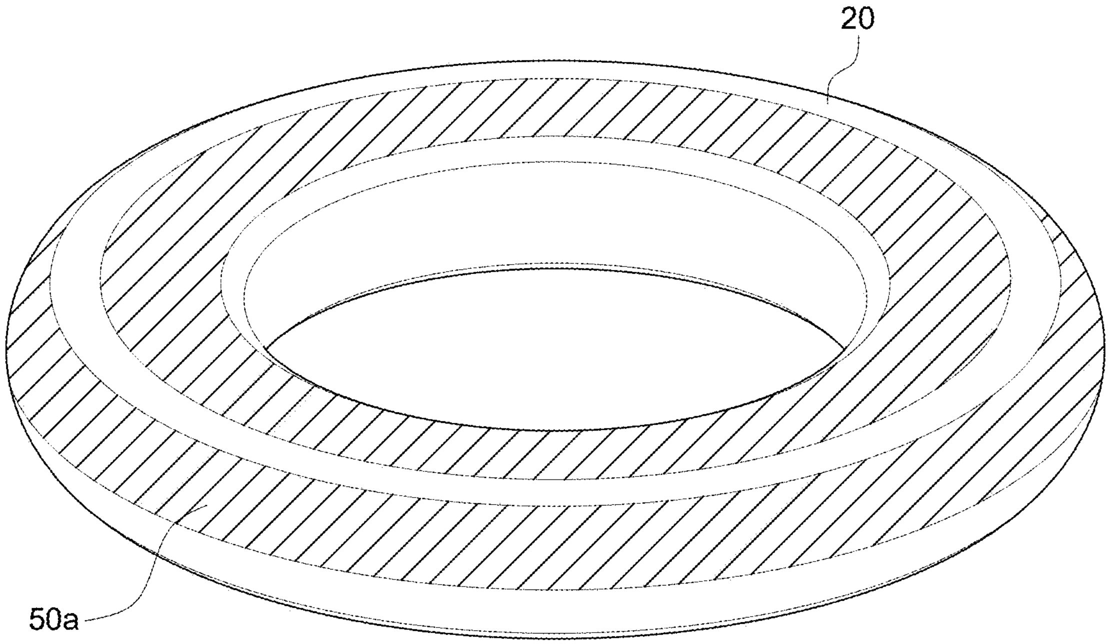
FIG. 6A illustrates an embodiment of the toroidal drag-ring (20) including an internal mass-moment biasing insert (50*a*) positioned within the body of the torus. The internal biasing insert (50*a*) may shift the center of mass of the toroidal drag-ring (20) relative to its geometric center, thereby promoting preferential orientation and time-varying rotational behavior during agitation. Such biased motion may reduce persistent tip-up tumble states and facilitate more repeatable wake orientation while preserving free movement of the toroidal drag-ring within the bounded container.
Figure 6B:
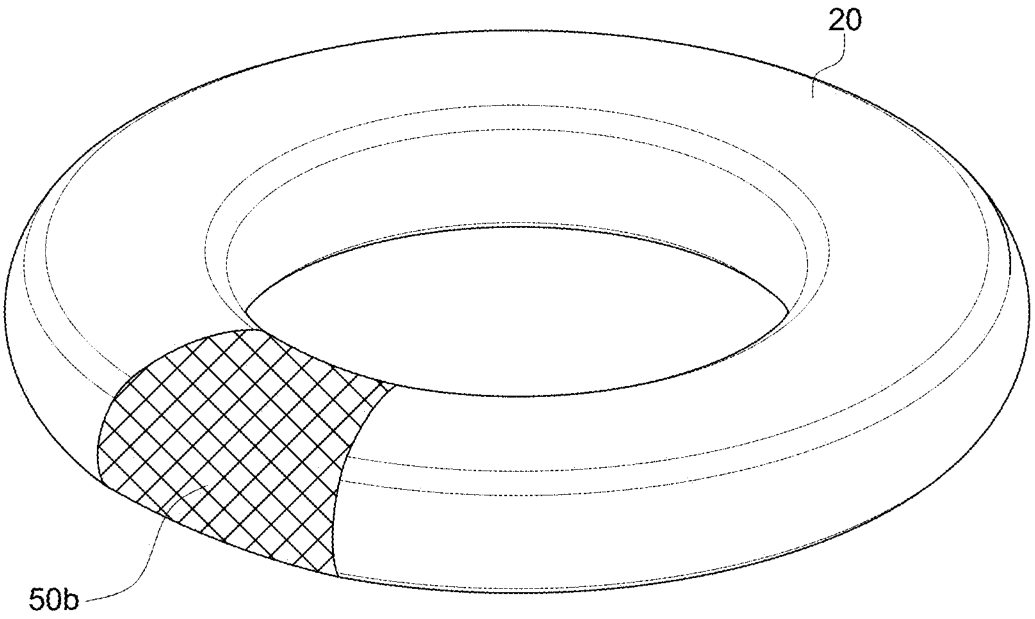
FIG. 6B illustrates an alternative embodiment of the toroidal drag-ring (20) including face-distributed mass-moment biasing (50*b*) extending along a surface region of the torus. The face-distributed biasing (50*b*) may induce preferential rolling or precessional motion of the toroidal drag-ring (20) during agitation, resulting in time-varying wake alignment and enhanced volumetric mixing. The embodiment of FIG. 6B provides an alternative mechanism for introducing mass-moment biasing without reliance on a localized internal insert and may be used independently of the embodiment shown in FIG. 6A.

Orientation control and stabilization authority is implemented through non-planar mass-moment biasing, as illustrated in FIG. 6A and FIG. 6B. Stabilization classes may include:

1. Keel-weighted mass inserts positioned inside the torus interior to bias broadside drag presentation during shaking or agitation demand, while preserving rotational mobility in mixing modes.
2. Rigid alignment rails, or strut collars features that maintain shear-generation projection and wake turbulence during agitation cycles.

In mixing mode actuation, the torus is permitted to tumble freely through viscous media to maximize pigment sweep, chaotic advection, and floc breakup.

To support maximum mixing, the system includes optional orientation stabilization mechanisms, including:

Keel-weighted mass biasing,
Radial moment distribution rails,
Rigid translation struts, and/or
Container-compatible attitude-stable torus housings, all configured to maintain turbulence, while enabling high-shear tumble cycles when employed in bounded fluid reservoirs for mixing modes.

Orientation stabilization is therefore produced by rigid geometry and mass-moments. The following subsection details container-scaling dependencies governing torus geometry and mass-moment assignment for mixing mode embodiments.

Fluid Mechanics Basis of Toroidal Mixing

Mixing performance of the rigid toroidal drag-ring is governed by established principles of fluid mechanics. In viscous fluid systems, the transition from laminar to turbulent flow is characterized by the Reynolds number (Re), defined as:

$$Re=\rho_f V D/\mu \qquad \text{Equation (1):}$$

where $\rho_f$ is the density of the fluid, V is the characteristic relative velocity between the toroidal drag-ring and the surrounding fluid, D represents a characteristic toroidal dimension selected from ODt or Tt depending on orientation, and is the dynamic viscosity of the fluid, as applicable.

In contrast to conventional mixing approaches that rely on bulk fluid displacement or repeated point impacts, the toroidal drag-ring operates by influencing localized boundary-layer behavior between the moving rigid body and the surrounding fluid. The geometry of the toroidal drag-ring is selected to promote flow separation and shear-dominant turbulence at the fluid-solid interface, thereby triggering a dominant mixing regime without materially altering bulk fluid properties or requiring increased agitation energy. As a result, relatively small changes in the geometry and mass distribution of the toroidal drag-ring can produce system-level changes in mixing behavior within the bounded container.

Determination of toroidal drag-ring dimensions and geometry for mixing embodiments is informed by established principles of fluid mechanics, including conservation of momentum and mass continuity as applied to fluid flow around rigid bodies. In particular, the momentum equation derived from Newton's second law provides a framework for understanding how pressure gradients, inertial forces, and viscous effects govern relative motion between the toroidal drag-ring and the surrounding fluid during agitation. The continuity equation further informs how fluid volume and flow redistribution occur within the bounded container as the torus moves and changes orientation. In practice, these governing principles are applied through simplified scaling relationships, non-dimensional parameters such as Reynolds number, and empirical or numerical evaluation to select torus outer diameter, thickness, mass distribution, and cross-sectional profile appropriate for the container geometry and fluid properties. Computational modeling tools, including Computational Fluid Dynamics (CFD), may be employed to visualize and refine these relationships for particular embodiments; however, such modeling is illustrative only and is not required to determine operable torus dimensions or to practice the invention. For avoidance of doubt, the disclosed advantages do not arise from toroidal geometry alone, but from the interaction of geometry, mass distribution, and container-bounded flow conditions that together induce controlled boundary-layer separation and wake formation. Inherent wake formation alone, absent geometry-fixed separation contours, is insufficient to produce the bounded wake envelope described herein.

During agitation of a container, the freely mobile toroidal drag-ring accelerates through the fluid volume and repeatedly changes orientation. These motions produce localized regions of flow separation and shear. The geometry of the torus is selected such that expected agitation velocities generate Reynolds numbers sufficient to promote separation-induced turbulence, even in relatively viscous suspensions. Observed mixing effectiveness is a continuous function of agitation energy and geometry, and does not exhibit a discrete threshold at the stated Reynolds number bounds. References to Reynolds number herein are intended to describe relative flow regimes and scaling behavior, and do not imply fixed thresholds or minimum values required for operation.

Unlike paddles, blades, or cavity-forming agitators, the toroidal geometry generates turbulence primarily through boundary-layer separation rather than through cutting or entrainment. Accordingly, effective mixing can be achieved without internal crevices, vanes, or obstructions that would trap pigment particles or increase clogging risk. The toroidal drag-ring is not required to maintain any fixed orientation relative to gravity or container axis during operation.

The annular geometry of the torus differs fundamentally from spherical agitators (18) in that it presents a directionally asymmetric profile comprising an outer circumference, an inner opening, and a curved cross-section. This geometry promotes multiple interacting flow-separation regions around both the outer and inner circumferences, creating intersecting shear layers, vortex shedding, and chaotic advection that enhance homogenization of viscous suspensions.

Boundary-layer separation is a primary mechanism underlying operation of the invention. As the torus moves through fluid, the no-slip condition forms a boundary-layer on its surface. Bluff or separation-contoured profiles, as illustrated in FIG. 3A and FIG. 3B (profiles 15 and 17), cause the boundary-layer to detach at controlled locations, forming wakes that impart high shear stresses to the surrounding fluid. These wakes are inherently three-dimensional due to the annular shape of the torus, generating horseshoe vortices, ring vortices, and turbulent eddies that disrupt pigment agglomerates and stratified layers.

The toroidal drag-ring is capable of multiple motion modes inside a partially filled container, including rolling, sliding, oscillating, flipping, and translating from end to end. Each motion mode creates distinct fluid responses and contributes to multi-axis mixing. The presence of substantial headspace in pressurized aerosol containers further increases sloshing dynamics and phase-interface shear fields, conditions under which the toroidal geometry remains highly effective.

Effective design of the toroidal drag-ring involves balancing competing factors including diameter, mass, and cross-sectional thickness. If the torus outer diameter is too small relative to container width, insufficient flow is generated; if too large, mobility may be impaired. Similarly, insufficient mass produces a weak inertial response, while excessive mass reduces acceleration during manual shaking. The invention addresses these constraints through the scaling relationships described herein, including $OD_t$-to-$D_c$ ratios and $OD_t$:$T_t$ thickness ratios. Tuning dependencies governing these competing design factors are summarized in Table 2.

In representative consumer aerosol paint cans, effective toroidal dimensions include outer diameters on the order of approximately 0.45 to 0.65 times container internal diameter ($D_c$) by way of non-limiting example, with thicknesses selected to maintain rigidity and dip-tube clearance, as summarized in Table 2. These ranges enable turbulent shear generation even at moderate shaking velocities and across a wide range of viscosities.

Figure 4:
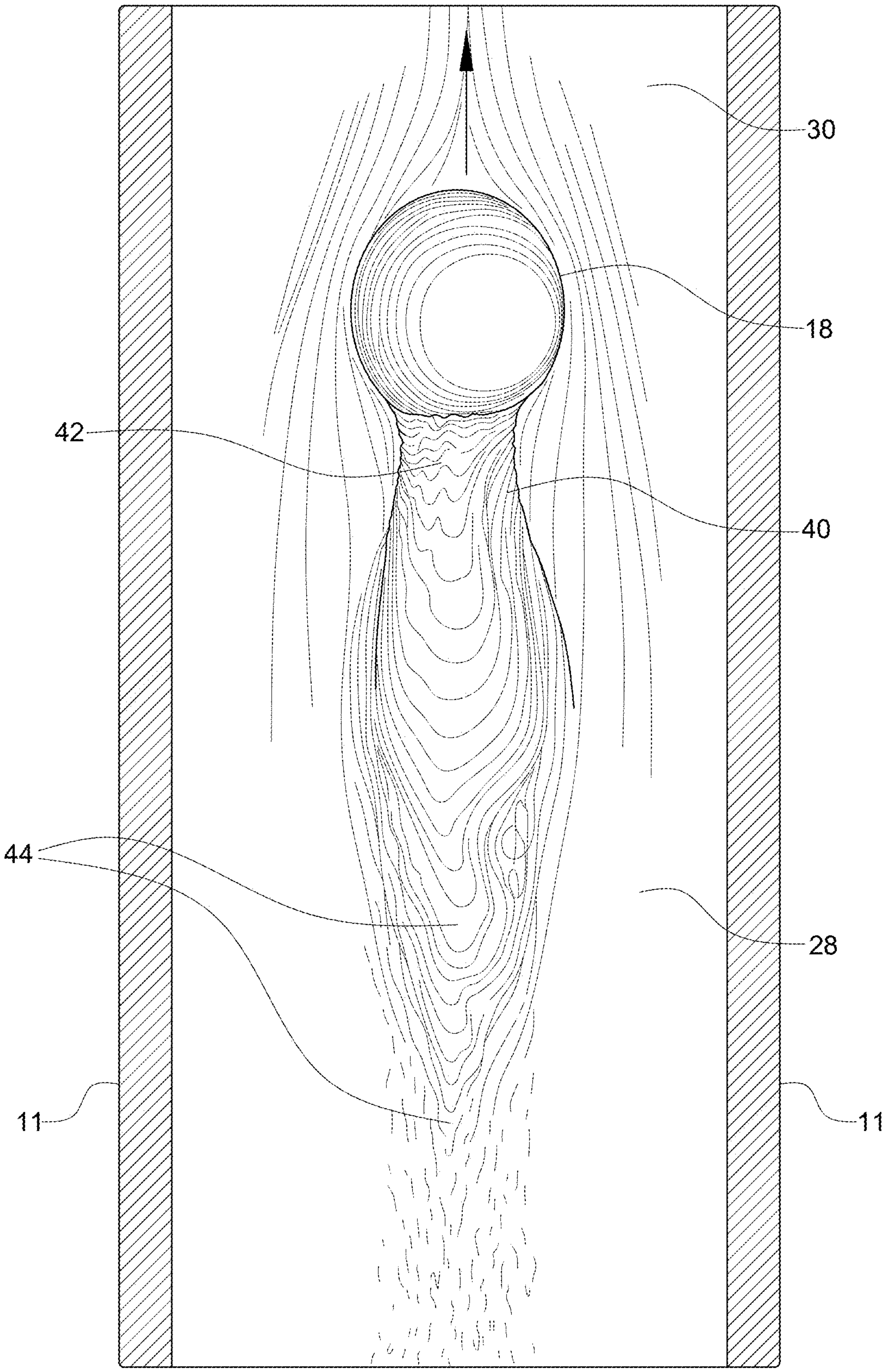
FIG. 4 for comparison only, schematically illustrates representative fluid (30) mixing behavior within a bounded container (11) for a generally spherical agitator (18), shown for comparative purposes relative to the toroidal drag-ring (20) illustrated in FIG. 5. During agitation, the spherical agitator (18) may produce flow conditions characterized by intermittent dead-zone (28) persistence and variable tumbling or translational states. As shown schematically, the spherical agitator (18) generates an axial wake region (40) extending downstream in alignment with the direction of motion, a low-velocity recirculation zone (42) forming as a localized sub-region within the axial wake region and proximate the spherical agitator, and an asymmetric wake attachment region (44) in which the downstream wake intermittently drifts toward and tends to weakly interact with a container boundary wall due to confinement effects. These flow features are illustrative of wake behavior commonly associated with spherical agitation in bounded fluid volumes and are not intended to represent fixed or limiting flow boundaries. These wake behaviors (40, 42, 44) contrast with the bounded wake structures (90) generated by the toroidal drag-ring (20), as described below with reference to FIGS. 5 and 8.

An important distinction exists between the present bounded container (11) mixing application and external aerodynamic uses of toroidal bodies. In external deceleration applications, drag is governed primarily by projected area and steady separation. In the bounded container mixing environment of the present invention, performance is instead dominated by turbulent shear-trip effects and chaotic advection within confined volumes. The toroidal drag-ring is therefore optimized not for net translational drag, but for the generation of localized vortical structures that maximize pigment resuspension. These bounded container mixing principles apply regardless of container orientation, including upright, inverted, or tilted agitation states. These mixing principles apply under both manual and mechanically assisted agitation regimes. For comparison, wake behavior associated with spherical agitators in bounded containers is schematically illustrated in FIG. 4, which contrasts with the bounded wake structures produced by the toroidal drag-ring as described herein.

Design optimization and performance evaluation of the toroidal drag-ring (20) may optionally employ Computational Fluid Dynamics (CFD) analysis to visualize boundary-layer separation contours, wake interaction, and shear-dominant mixing behavior as a function of toroidal geometry, agitation velocity, and container confinement. Such CFD evaluation may be used during design-time or post-hoc analysis to assess the influence of cross-sectional profile, separation contouring, and projected agitation area on wake development and turbulence generation. The bounded and unbounded wake principles relevant to such analysis are schematically illustrated in FIG. 8, while the underlying fluid-mechanical relationships governing bounded wake behavior are described herein. Use of CFD analysis is illustrative and non-limiting, and is not required for practicing, enabling, or determining infringement of the invention.

In summary, the disclosed toroidal drag-ring operates on the principle that its annular geometry forces fluid to experience intersecting shear layers and chaotic wake structures, thereby creating turbulence at lower energy input than simpler shapes. These mechanisms provide the scientific foundation for the improved mixing performance achieved by the present invention.

Material Density and Surface Texture Considerations

The performance of the rigid toroidal drag-ring in generating turbulence and promoting fluid mixing is influenced not only by its overall geometry, but also by material density and surface characteristics. Effective mixing results from a balanced interaction between the inertial properties of the torus and the viscous and drag forces of the surrounding fluid. This balance may be conceptually described as a balanced design regime, wherein the torus must possess sufficient mass to generate meaningful momentum, yet remain light enough to respond rapidly to manual agitation.

Material density plays a direct role in this balance. For two toroidal drag-rings having identical outer geometry but different densities, the higher-density torus will exhibit greater inertial persistence once in motion, while the lower-density torus will accelerate more readily under the same applied shaking forces. Consequently, optimal performance is achieved when density is selected such that the torus moves freely and repeatedly through the fluid volume, generating relative velocity without becoming excessively sluggish or difficult to accelerate.

The invention therefore contemplates selection of torus material and density in coordination with geometry and fluid viscosity. In some embodiments, metals such as steel or brass may be employed to increase inertial momentum for highly viscous fluids. In other embodiments, engineering polymers or filled composites may be preferred to enhance mobility and motion reversals. The density of the material is thus intentionally selected to influence how the torus moves through the fluid and, in turn, the turbulence it creates.

In addition to density, the surface texture of the toroidal drag-ring can be configured to influence mixing behavior. A substantially smooth surface tends to minimize drag and promote higher translational velocity through the fluid. Conversely, a controlled degree of surface roughness can increase local flow disturbances and promote the formation of additional micro-vortices, thereby enhancing turbulent mixing. The invention recognizes that an intermediate level of surface texture may provide advantageous performance by increasing turbulence generation without unduly slowing torus motion.

Accordingly, the toroidal drag-ring may include intentionally patterned or textured surfaces, such as shallow dimples, cross-hatching, diamond patterns, or other non-planar surface features. Such features function to disrupt boundary-layer flow and to create localized eddies as the torus travels through the fluid, thereby increasing mixing efficiency. In some embodiments, surface features are sized and spaced to generate additional turbulence while maintaining a substantially cavity-free exterior that avoids fluid retention or clogging. For avoidance of doubt, surface features described herein are dimensioned such that they do not constitute functional fluid-retaining cavities as the term "cavity-free" is defined in the Scope and Interpretation section below. As used herein, dimples described in connection with the toroidal drag-ring are shallow, non-retentive surface features and do not form enclosed voids or cavities capable of trapping fluid or particulate material.

By way of non-limiting example, a toroidal drag-ring incorporating shallow dimples may operate in a manner analogous to a dimpled golf ball, wherein small surface perturbations promote the formation of a turbulent boundary-layer that reduces wake size and increases the effectiveness of fluid interaction. When applied to a mixing environment rather than to aerodynamics, such surface features can increase chaotic advection and shear mixing without requiring additional input energy.

The invention is not limited to any specific pattern or roughness profile. Surface treatments may be selected based on fluid viscosity, container size, and desired mixing intensity. In some embodiments, a lightly textured surface is employed to enhance turbulence while preserving adequate velocity. In other embodiments, a predominantly smooth surface may be preferred where rapid motion through very viscous fluids is desired.

These considerations of density and surface texture operate together with torus geometry to achieve the desired balance of momentum, responsiveness, and turbulence generation. Through coordinated selection of material properties and surface characteristics, the toroidal drag-ring can be optimized to create enhanced mixing across a wide range of fluid types and container configurations.

Asymmetric and Selective Surface Texture Embodiments

The toroidal drag-ring may incorporate intentionally varied surface textures in order to modify wake formation, boundary-layer behavior, and turbulence generation. In addition to uniformly textured embodiments, the invention contemplates configurations in which surface features are distributed asymmetrically or selectively across only a portion of the toroidal geometry.

Figure 7A:
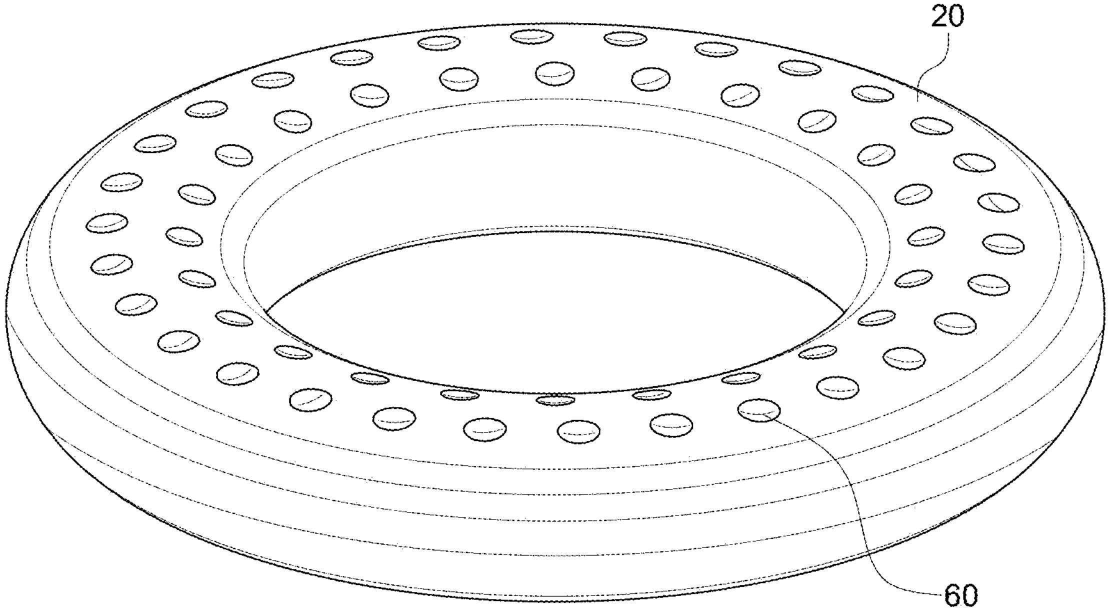
FIG. 7A illustrates an alternative embodiment of the toroidal drag-ring (20) including an exterior surface partially formed with shallow recessed dimples (60) arranged in a localized band proximate an intended separation arc. The dimples (60) are configured to perturb boundary-layer flow while preserving overall toroidal geometry and free mobility within a bounded container. The embodiment of FIG. 7A may be implemented with variations in outer diameter, cross-sectional thickness, inner opening diameter, and cross-sectional profile, while maintaining a rigid exterior surface suitable for mixing applications.

In one class of embodiments, only a first portion of the torus surface is textured while a second portion remains substantially smooth. For example, one lateral face of the torus may include a pattern of dimples or other surface perturbations, as illustrated for example in FIG. 7A, while the opposite face remains smooth. Such an arrangement introduces directional asymmetry into the flow field, causing differing separation behavior depending upon orientation of the torus during motion. This asymmetric configuration can generate enhanced disturbance patterns and promote additional chaotic advection as the torus tumbles and changes orientation within the container.

Figure 7B:
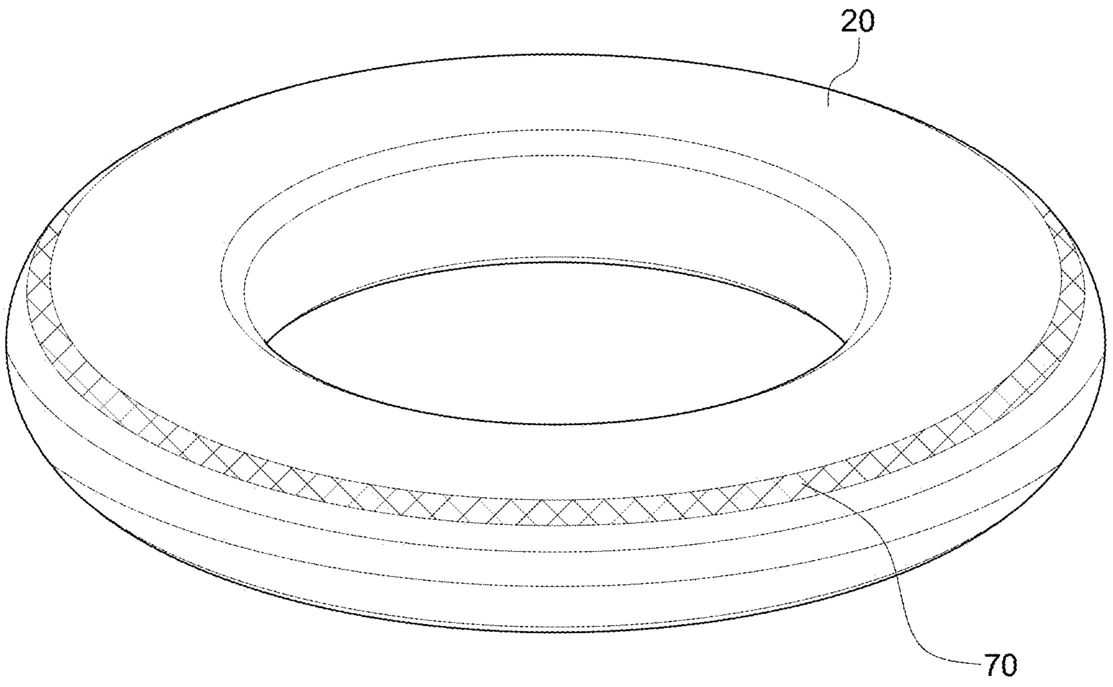
FIG. 7B illustrates an alternative embodiment of the toroidal drag-ring (20) including a continuous circumferential shoulder (70) formed along an exterior surface region proximate an intended separation location. The shoulder provides a gentle geometric discontinuity configured to promote repeatable boundary-layer separation without introducing sharp edges. As with other embodiments, the toroidal drag-ring of FIG. 7B may be configured with different dimensional ratios and cross-sectional geometries while maintaining structural rigidity and compatibility with bounded container mixing.
Figure 7C:
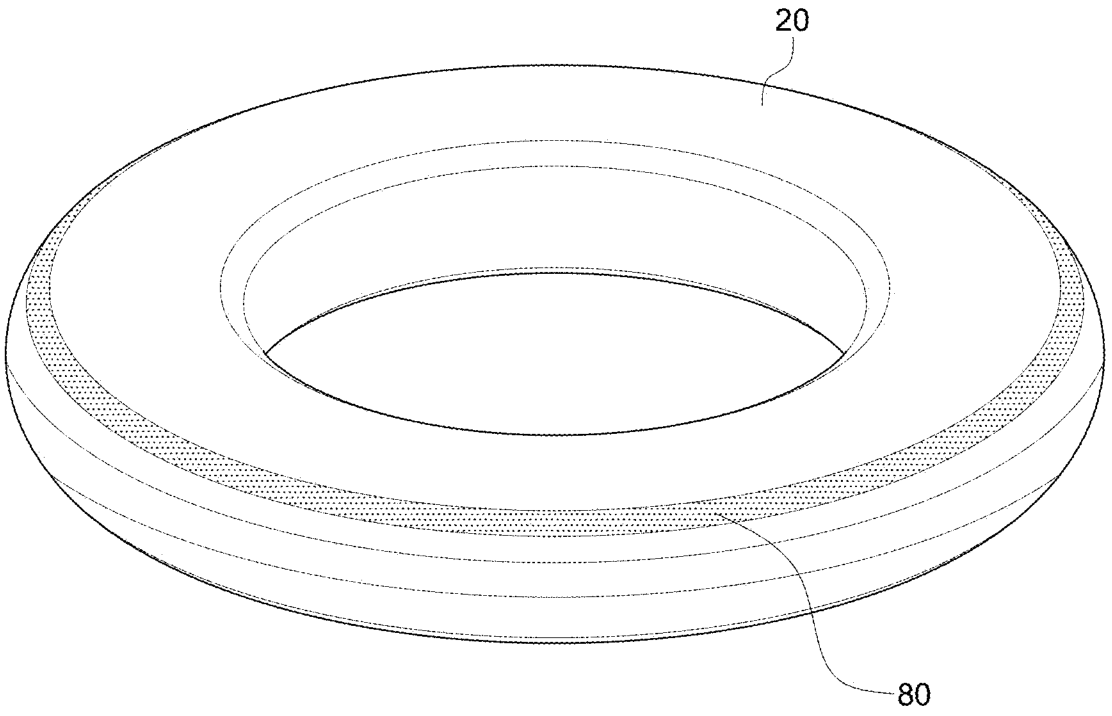
FIG. 7C illustrates an alternative embodiment of the toroidal drag-ring (20) including a localized textured band (80) defining a roughness region positioned near an intended separation arc. The textured band is configured to introduce localized surface perturbations while leaving remaining surface regions substantially smooth. The embodiment of FIG. 7C may likewise be realized with variations in overall size, cross-sectional profile, and stabilization features, provided that the toroidal drag-ring remains freely movable and structurally rigid within a bounded fluid volume.

In another class of embodiments, surface texture is confined to the outer circumferential region of the torus while the inner annular region surrounding the central opening remains substantially smooth, as illustrated for example in FIG. 7C. This configuration is conceptually analogous to the tread of a tire in which raised, or textured elements are positioned along the outer periphery but are absent near the central opening. Selective outer-circumference texturing can create a layered turbulence effect in which the exterior surface of the torus generates strong localized disturbances, while the inner region preserves smoother flow to maintain mobility and reduce the likelihood of fluid entrapment. Such embodiments may provide a beneficial balance between increased mixing efficiency and reduced clogging risk.

The invention further contemplates the use of non-recessed surface features, sometimes referred to as "reverse dimples (i.e., raised protrusions rather than recessed cavities)" or protrusions, in place of or in addition to recessed dimples. In certain embodiments, a circumferential shoulder or raised geometric discontinuity may be formed along an exterior surface region proximate an intended separation arc, as illustrated for example in FIG. 7B, to promote repeatable boundary-layer separation without introducing sharp edges or fluid-retaining cavities. Raised bumps, ridges, triangular facets, star-shaped elements, or other convex perturbations can be employed to disrupt flow without forming pockets in which pigments or particulates might accumulate. Because these features project outward rather than inward, they reduce the risk of material retention and facilitate easier cleaning and long-term reliability.

Different geometries of protrusions may be selected to tailor the character of the induced turbulence. Sharp-edged or angular features tend to promote earlier boundary-layer separation and stronger vortex shedding, whereas rounded bumps create smoother but still effective disturbances. The invention is not limited to any particular shape; rather, the selection of feature geometry may be guided by the desired balance between turbulence intensity, manufacturability, and resistance to residue buildup.

While raised surface features can be advantageous for mixing, embodiments employing protrusions may be configured with structural robustness in mind. Excessively thin or fragile projections could potentially be damaged by repeated impacts with the container walls during agitation. Accordingly, in certain embodiments protrusions are formed with low profiles, radiused edges, or integral structural reinforcement to minimize the risk of fracture or detachment. All such surface features are dimensioned to avoid fluid-retaining cavities and are functionally distinct from recessed pockets or voids.

By selectively distributing surface texture, whether as dimples, reverse dimples, ridges, or patterned regions, the toroidal drag-ring can be tuned to produce unique and effective flow disturbances not achievable with uniformly smooth or uniformly textured surfaces. These asymmetric and selective surface configurations provide additional degrees of freedom for optimizing mixing performance across a wide range of fluids and container types.

Wake and Shear-Turbulence Design Principles (Mixing Mode)

In bounded container mixing embodiments, the toroidal drag-ring is dimensioned and mass-biased according to container volume, characteristic internal width, fluid viscosity, and expected agitation energy, as illustrated in FIG. 6A and FIG. 6B, such that agitation operates in a Reynolds shear-trip regime optimized for internal turbulence generation and pigment sweep rather than net translational drag, as further illustrated in FIG. 8. The toroidal drag-ring outer diameter $OD_t$ is selected relative to the container's characteristic internal width $D_c$ to permit free dynamic motion within the container while providing sufficient projected drag to induce wake-dominated flow separation. Effective mixing may be achieved with toroidal bodies having outer diameters substantially smaller than the container width, including sizes comparable to conventional spherical agitator media, provided that tube thickness, mass distribution, and material density are selected to generate an adequate inertial response.

The torus ring thickness $T_t$ is selected relative to $OD_t$ to preserve structural rigidity, avoid residue-retaining cavities, and limit interference with internal container features such as valves or dip-tubes. In representative embodiments, the ring thickness satisfies:

$$0.07\ OD_t \le T_t \le 0.14\ OD_t \quad \text{Equation (2):}$$

which provides a non-limiting dimensional envelope balancing structural rigidity, inertial response, clearance from internal container features, and minimization of stagnation or residue-retaining regions.

In representative, non-limiting embodiments, rotational shear-turbulence is promoted by an inertial mass-moment bias $M_t$ of the toroidal drag-ring selected relative to the mass of the contained fluid. As used herein, $M_t$ represents an effective inertial mass-moment of the toroidal body that accounts for its mass distribution and resistance to angular acceleration under agitation. In such embodiments, the inertial mass-moment bias satisfies the following relationship:

$$0.18\rho_f V_c \le M_t \le 0.42\rho_f V_c \quad \text{Equation (3):}$$

where $\rho_f$ is the fluid density and $V_c$ is the container volume. The foregoing mass-moment relationship is illustrative and non-limiting, and effective mixing may be achieved with toroidal drag-ring mass-moments falling outside the stated range.

This relationship expresses a fractional inertial coupling between the toroidal body and the contained fluid mass that is sufficient to induce rotational slip, wake shedding, and shear-dominated flow separation, while avoiding excessive inertia that would suppress dynamic mobility or result in predominantly translational drag behavior. The stated bounds are provided as an illustrative design envelope and do not imply fixed thresholds or required limits for operation. Dimensional ranges summarized in Table 2 and representative metric implementations shown in Table 3 are incorporated herein as non-limiting examples consistent with the foregoing scaling relationships.

In practice, selection of the foregoing geometric, dimensional, and inertial parameters may be guided by computational design tools or parametric modeling techniques, such as spreadsheet-based analyses, numerical solvers, or MATLAB-like or equivalent numerical computing environments, to explore the interaction of container dimensions, fluid properties, agitation energy, and toroidal body geometry. Such modeling may be used to evaluate relative wake formation, inertial response, and flow separation behavior across candidate designs and to identify combinations that promote effective mixing within a given container. These computational techniques are provided as optional design aids and do not limit the invention, as the disclosed mixing behavior may be achieved through empirical selection, prototyping, or other engineering methods consistent with the dimensional and scaling relationships described herein.

In additional non-limiting embodiments, the disclosed toroidal drag-ring mixing elements may be employed within sealed or bounded containers used for the preparation, reconstitution, or homogenization of ingestible or injectable compositions, including suspensions, emulsions, concentrates, or reconstituted powders. In such embodiments, the geometry-driven shear and wake-dominated flow behavior described herein facilitates dispersion without reliance on impellers or fixed mixing blades, and without requiring increased agitation energy. Material selection and dimensional scaling may be adapted to meet application-specific compatibility requirements, while preserving the flow-regime control principles described above.

Pressurized Spray can Embodiments

In certain embodiments, the bounded container comprises a pressurized aerosol spray can enclosing a viscous fluid formulation, such as paint, coating material, or pigment-bearing suspension, together with a propellant system, as illustrated in FIG. 1. In representative consumer spray paint cans, the liquid paint fraction occupies only a portion of the internal container volume. By way of example and without limitation, the liquid contents may occupy approximately 30% to 50% of the internal container volume, with the remaining volume defining a propellant headspace. The precise liquid fill fraction may vary depending on formulation viscosity, intended spray duration, can size, pressure rating, and agitation conditions. In cans labeled as containing approximately 12 ounces (oz) net contents, the liquid paint may, by way of example, weigh on the order of approximately 10 oz to 12 oz while occupying approximately 40%±10% of the total internal volume.

The remaining internal volume, typically comprising approximately 50% to 70% of the container volume, defines a propellant headspace, as shown in FIG. 1. This headspace contains a compressed propellant system and serves to maintain internal pressure, enable atomization of the liquid formulation, and drive liquid upward through a dip-tube toward a valve outlet during dispensing. The propellant is typically not compressed air, but more commonly includes liquefied hydrocarbons such as propane, butane, and isobutane, as well as dimethyl ether (DME), with compressed gases such as carbon dioxide or nitrogen used in certain embodiments. Liquefied propellants undergo phase change as pressure decreases, thereby maintaining substantially constant internal pressure in the container during use.

Accordingly, a pressurized spray can typically contains multiple phases, including a liquid paint phase, a liquid propellant phase that may be partially miscible with the paint formulation, and a vapor-phase propellant occupying the headspace, as illustrated in FIG. 1. As dispensing proceeds, liquid propellant flashes to vapor, maintaining pressure while the relative proportions of liquid and vapor phases change. As the liquid level decreases over the service life of the container, effective mixing becomes increasingly important to maintain pigment dispersion and spray consistency.

Under these conditions, the disclosed rigid toroidal drag-ring operates entirely within the liquid phase and is configured to move freely within a partially filled container. The presence of a substantial headspace produces vigorous sloshing and complex shear fields during manual agitation. As the toroidal drag-ring tumbles and translates through the liquid volume, it generates separation-induced shear turbulence rather than relying solely on bulk rotational flow, as illustrated in FIGS. 2-5.

As further shown in FIGS. 2-5, the rigid toroidal geometry remains effective across a range of fill states and avoids obstruction of a valve or dip-tube inlet even as the liquid level decreases. The cavity-free exterior profile reduces residue retention and particulate accumulation, thereby promoting consistent mixing performance throughout the operational life of the spray can. In a representative embodiment for a standard 12-ounce consumer aerosol paint can, a rigid acetal toroidal drag-ring having $OD_t$ of approximately 36 mm and thickness $T_t$ of approximately 4.0 mm provides effective pigment resuspension without dip-tube obstruction.

Design Rule Highlights for Tuning

- Mobility clearance: select $OD_t$ so the torus remains freely mobile at the highest expected viscosity and lowest expected fill state.
- Wake authority: select $OD_t$ to maintain broadside separation-induced shear across the agitation stroke, typically between 0.45 to 0.65 times $D_c$ for aerosol paint geometries.
- Valve/dip-tube non-obstruction: ensure the torus does not enter or lodge in the valve cup/dip-tube inlet region during agitation across the full fill life (new to near-empty).
- Late-life mixing: anticipate lower liquid fill increasing impact and slosh; avoid oversized OD ratios that can cause intermittent interference.

For convenience, Table 3 below provides non-limiting metric equivalents of representative torus dimensional ranges described herein, corresponding to the dimensional ratios illustrated, for example, in one or more of FIGS. 1-5. The dimensional ratios disclosed herein describe preferred engineering regimes and do not define the boundaries of the invention. The foregoing dimensional ratios and geometric principles are applicable to a range of bounded mixing containers, including pressurized aerosol spray cans, as described below. While pressurized aerosol spray can embodiments are described in detail, the disclosed rigid toroidal drag-ring system is equally applicable to non-pressurized bounded mixing containers including sealed industrial vessels, laboratory mixing bottles, and portable fluid reservoirs, wherein agitation-induced shear turbulence is desirable without internal paddles or shafts. Table 3 provides representative metric examples corresponding to the non-limiting dimensional ratios described herein.

TABLE 3

Metric Equivalents of Parameters for Rigid Toroidal Drag-Ring Mixing in Pressurized Spray Cans

| Parameter | 12 oz net can embodiments (mm) | 16 oz net can embodiments (mm) | Notes |
|---|---|---|---|
| Container internal diameter ($D_c$) | ~66-68 mm | ~66-68 mm | Typical internal diameter for 211-diameter aerosol families |
| Torus outer diameter ($OD_t$) | 30-42 mm | 32-43 mm | Corresponds to ~0.45-0.65 · $D_c$ |
| Torus thickness ($T_t$) | 2.5-7.0 mm | 2.5-7.2 mm | Consistent with $OD_t$:$T_t$ ≈ 6:1 to 12.5:1 |

TABLE 3-continued

| Metric Equivalents of Parameters for Rigid Toroidal Drag-Ring Mixing in Pressurized Spray Cans | | | |
|---|---|---|---|
| Parameter | 12 oz net can embodiments (mm) | 16 oz net can embodiments (mm) | Notes |
| Torus inner opening diameter ($ID_t$) | 19-33 mm | 20-34 mm | ≥0.60 · $OD_t$; preferred 0.65-0.80 · $OD_t$ |
| Minimum radial clearance (per side) | ≥2.5 mm | ≥2.5 mm | valve/dip-tube non- Ensures free mobility and interference |

The numerical values shown in Table 3 are exemplary and non-limiting. Other dimensional combinations consistent with the ratios disclosed herein may be used without departing from the scope of the invention.

CFD-Based Design Evaluation and Bounded Wake Symmetry within Container Verification Workflows In preferred engineering workflows, torus geometry ratios, projected agitation area, boundary-layer separation behavior, and wake turbulence may be evaluated and tuned using Computational Fluid Dynamics (CFD) modeling, including finite-volume or lattice-Boltzmann solvers, to assess shear-dominant or Reynolds shear-trip mixing regimes prior to manufacture. Such modeling may be employed to analyze separation contours, wake interaction, and turbulence development in relation to toroidal geometry and container confinement. The distinction between bounded and unbounded wake behavior relevant to such evaluations is schematically illustrated in FIG. 8, while the fluid-mechanical basis, scaling relationships, and design implications of bounded wake behavior are described above under the heading "Fluid Mechanics Basis of Toroidal Mixing". Use of CFD analysis is optional and non-limiting; the invention may be practiced and implemented using the dimensional ranges and principles disclosed herein without any CFD modeling. Verification, as used herein, refers to design-time or post-hoc analytical evaluation and does not imply that CFD validation is required for operability, enablement, or infringement determination.

SCOPE AND INTERPRETATION

As used herein, the term toroidal is intended to encompass annular, quasi-toroidal, segmented, non-circular, non-axis-symmetric, and geometrically perturbed ring bodies that functionally generate separation-induced shear turbulence within a bounded fluid volume. Perfect mathematical toroidicity is not required, and minor geometric deviations, discontinuities, or manufacturing tolerances that do not materially alter mixing performance are contemplated.

The term cavity-free refers to the absence of functional recesses that materially retain fluid, particulates, or residues during agitation, and does not exclude incidental surface textures, seams, joints, micro-features, or manufacturing artifacts that do not impede mixing or promote clogging. For avoidance of doubt, surface features described herein are dimensioned such that any recessed or protruding geometry does not form enclosed voids or stagnant pockets capable of retaining fluid during agitation.

References to rigidity or rigid structures denote functional rigidity under expected agitation forces and fluid loads, and include semi-rigid, composite, elastomer-reinforced, or multi-material constructions that maintain effective geometric form during operation. Structures exhibiting limited elastic deformation while maintaining effective separation geometry during agitation are included within the meaning of rigid as used herein.

Dimensional ratios, Reynolds number ranges, inertial mass relationships, and scaling parameters disclosed herein describe preferred and illustrative engineering regimes and do not define absolute boundaries of the invention. Mixing performance may occur outside the stated ranges depending on container geometry, agitation energy, fluid properties, and operational conditions. Unless otherwise stated, numerical values and ranges disclosed herein are approximate and may vary by manufacturing tolerances, fluid properties, or operational conditions without departing from the scope of the invention.

The mechanisms of mixing described herein include, but are not limited to, boundary-layer separation, shear-induced turbulence, chaotic advection, vortex shedding, wake interaction, and combinations thereof. The invention is not limited to any single turbulence-generation mechanism.

Agitation of the container may be manual or mechanically assisted and may include shaking, rotation, oscillation, vibration, inversion, acoustic excitation, or inertial forcing, whether continuous or intermittent.

Although pressurized aerosol containers are described as representative embodiments, the disclosed system applies broadly to any bounded fluid reservoir, including non-pressurized containers, industrial vessels, laboratory mixing containers, and portable fluid reservoirs.

Computational Fluid Dynamics (CFD) modeling and other analytical tools are provided as optional design and evaluation aids and are not required to practice the invention. The disclosed embodiments are manufacturable and operable based on the present disclosure without reliance on simulation or physical prototype testing.

The scope of the invention is intended to include all functional equivalents that achieve substantially the same mixing result through substantially the same interaction between annular geometry, fluid inertia, and agitation-induced flow, whether now known or later developed. The disclosed mixing effects may arise under low-energy, moderate-energy, or high-energy agitation conditions, including regimes where inertial, viscous, or mixed-flow forces dominate.

System Advantages and Conversion-Ready Design Principles

Figure 5:
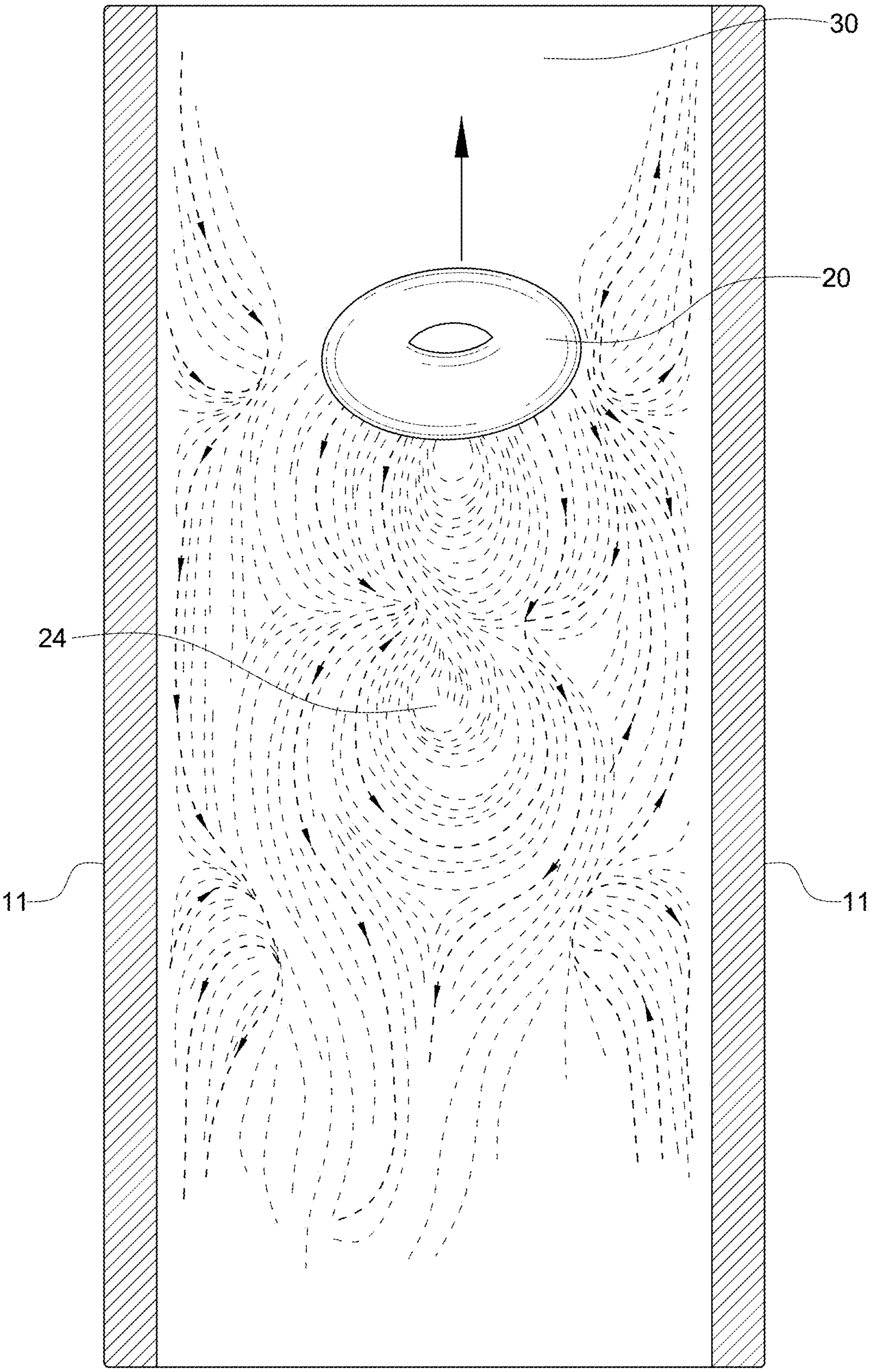
FIG. 5 schematically illustrates representative fluid (30) flow patterns (shown in dashed lines to indicate schematic, non-steady behavior) generated by the toroidal drag-ring (20) during agitation within a bounded container (11). As shown, the toroidal drag-ring (20) promotes separation-induced shear, localized vortex shedding (24), and shear-layer interaction that may result in chaotic advection and disruption of laminar or low-exchange regions within the container. In contrast to spherical agitation, the wake structures generated by the toroidal drag-ring (20) tend to remain spatially bounded and repeatable under typical agitation conditions, thereby facilitating redistribution and resuspension of pigments, particulates, or other suspended materials. Applicants have recognized that reduced mixing performance observed with spherical agitators is commonly associated with unbounded or non-repeatable wake behavior in confined volumes, rather than from insufficient agitation energy or surface contact alone. As discussed with reference to FIG. 4, wake behavior induced by different mixing bodies may include regions of reduced velocity, recirculation, and wall interaction, including the axial wake region (40), recirculation zone (42), and asymmetric wake attachment region (44), which contrast with the bounded wake structures (90) generated by the toroidal drag-ring in bounded fluid volumes.

In contrast to conventional spherical agitator balls, the disclosed toroidal drag-ring architecture provides a rigid, cavity-free, attitude-stable separation-induced turbulence capable of functioning as a high-turbulence internal mixing inducer in bounded containers, as illustrated in FIG. 5. Mixing mode drag ratios are tuned to favor Reynolds shear-trip regimes within a container, promoting chaotic advection, floc breakup, and pigment sweep. These principles ensure that the toroidal drag-ring system operates as an agitation system, providing a manufacturable alternative with improved mixing characteristics in fluid mixing, without introducing clog. Mode-dependent turbulence induction may be achieved by the following configuration logic: Mixing turbulence induction is container-scaled for Reynolds shear-trip turbulence. The disclosed mixing system is applicable to coatings, chemical formulations, diagnostic fluids, nutritional compositions, and other viscous or particulate suspensions prepared within sealed containers.

Computational Fluid Dynamics (CFD) workflows may optionally be employed prior to manufacture to assess fluid mixing and turbulence behavior, and physical prototypes are not required in order to practice the invention.

Novelty Positioning and Family Scope

To the Applicant's knowledge, no prior art reference discloses or suggests a freely mobile toroidal drag-ring disposed within a bounded fluid container for the purpose of generating separation-induced turbulence as described herein. Accordingly, the disclosed system demonstrates that rigid toroidal drag-rings may serve as first-class agitation using repeatable flow separation, localized shear layers, and mass-biased attitude stability, representing a manufacturable, scalable, and non-obvious advancement over spherical agitators, as illustrated in FIG. 5.

It is intended that the scope of the invention be defined by the appended claims and their legal equivalents. While certain exemplary embodiments have been shown and described, various modifications and equivalents may be employed without departing from the scope of the invention as defined by the appended claims. The embodiments described herein are illustrative and not limiting. Variations in geometry, materials, or manufacturing technique may be adopted without departing from the scope of the invention as defined by the appended claims.

Although the present disclosure has been described with reference to a number of illustrative embodiments, it should be understood that numerous other modifications and embodiments can be derived by those skilled in the art that will fall within the spirit and scope of the principles of this disclosure. More particularly, reasonable variations and modifications are possible in the design parameters and configuration within the scope of the foregoing disclosure, the drawings, and the appended claims without departing from the spirit of the disclosure. In addition to the variations and modifications in the design, parameters, geometry, materials, manufacturing techniques, and configurations, alternative uses will also be apparent to those skilled in the art.

The invention claimed is:

1. A fluid mixing system comprising: a bounded container configured to contain a fluid; and a rigid toroidal drag-ring configured to move freely within the bounded container during agitation, the toroidal drag-ring comprising an annular body defining a central opening, wherein the toroidal drag-ring has a non-streamlined annular cross-section including a separation-inducing surface region positioned circumferentially about the annular body to initiate boundary-layer separation at a predetermined circumferential location relative to a direction of motion of the toroidal drag-ring during agitation, wherein movement of the toroidal drag-ring through the fluid produces interacting inner-circumference and outer-circumference shear layers that generate separation-induced shear turbulence, wherein the resulting wake structures form a spatially bounded wake envelope that remains confined within the bounded container and repeatedly interacts with container boundaries over successive agitation cycles, wherein the wake envelope is maintained by the annular geometry and separation-inducing surface region of the toroidal drag-ring rather than by surface roughness or bulk fluid displacement alone, and wherein fluid is permitted to pass through the central opening of the toroidal drag-ring to interact with downstream wake structures.

2. The fluid mixing system of claim 1, wherein the cross-section of the toroidal drag-ring defines an annular separation arc configured such that boundary-layer separation initiates at a repeatable angular location relative to a direction of motion of the toroidal drag-ring during agitation, and wherein the resulting wake structures remain spatially constrained by the container boundaries without requiring physical contact between the toroidal drag-ring and the container.

3. The system of claim 1, wherein the toroidal drag-ring has an annular geometry including an outer circumference, an inner opening, and a separation-contoured cross-section that promotes vortex shedding and chaotic advection during agitation.

4. The system of claim 1, wherein the toroidal drag-ring includes a bluff or separation-contoured cross-section selected from the group consisting of a D-section profile and a cambered leading-face/trailing-face profile.

5. The system of claim 4, wherein a separation depth of the cross-section is between approximately 4 percent and 12 percent of the torus thickness.

6. The system of claim 1, wherein the toroidal drag-ring has an outer diameter selected relative to a characteristic internal width of the bounded container to maintain free mobility while generating separation-induced shear turbulence.

7. The system of claim 1, wherein the toroidal drag-ring includes an inner opening diameter selected to prevent obstruction of internal container components including valves or dip-tubes.

8. The system of claim 1, wherein agitation produces wake structures that remain spatially bounded by container walls during operation, thereby promoting enhanced mixing performance as compared to a generally spherical agitator ball freely mobile in the bounded container under equivalent agitation conditions, without mechanically constraining translational or rotational motion of the toroidal drag-ring within the bounded container.

9. The fluid agitation system of claim 1, wherein the toroidal drag-ring operates within a Reynolds shear-trip regime sufficient to promote turbulent mixing without requiring operation at a fixed Reynolds number threshold, as compared to spherical agitation under equivalent agitation conditions.

10. The system of claim 1, further comprising an inertial mass-moment bias within the toroidal drag-ring configured to promote repeatable broadside presentation and suppress tip-up tumble states during agitation, without mechanically constraining translational or rotational motion within the container.

11. The system of claim 1, wherein the toroidal drag-ring includes surface features selected from shallow dimples, raised protrusions, ridges, micro-flats, or combinations thereof, the surface features being dimensioned to disrupt boundary-layer flow without forming fluid-retaining cavities.

12. The system of claim 1, wherein the toroidal drag-ring includes surface topology localized near an intended separation arc, the surface topology being configured to preserve boundary-layer separation under agitation.

13. A rigid toroidal drag-ring for fluid agitation, the rigidity including semi-rigid or composite structures maintaining functional geometry under agitation, comprising: an annular body having a closed centerline and a continuous exterior surface substantially free of fluid-retaining cavities, the annular body being structurally rigid under agitation-induced loads and configured to promote boundary-layer separation and shear turbulence when moving through viscous fluid.

14. The toroidal drag-ring of claim 13, wherein the annular body is monolithic or segmented and maintains functional rigidity sufficient to preserve separation-induced mixing behavior.

15. The toroidal drag-ring of claim 13, wherein the annular body includes an asymmetric mass distribution or inertial bias configured to influence orientation during agitation.

16. The toroidal drag-ring of claim 13, wherein the exterior surface includes separation-contoured geometry selected to promote vortex shedding without trapping fluid or particulates.

17. The toroidal drag-ring of claim 13, wherein the annular body is formed from a material selected from solvent-resistant engineering polymers, corrosion-resistant metals, composites, or combinations thereof.

18. A method of mixing viscous fluid within a bounded container, comprising: agitating a container enclosing viscous fluid and a freely mobile rigid toroidal drag-ring, such that movement of the toroidal drag-ring through the fluid induces boundary-layer separation and separation-induced shear turbulence that disrupts laminar flow regions and resuspends settled particulates.

19. The method of claim 18, wherein the agitation is manual or mechanically assisted.

20. The method of claim 18, wherein the toroidal drag-ring generates chaotic advection and multi-axis mixing through rolling, tumbling, oscillating, or translating motion within the container.

21. The method of claim 18, wherein the toroidal drag-ring operates within a bounded container selected from pressurized aerosol canisters, sealed industrial vessels, laboratory containers, or portable fluid reservoirs.

22. The method of claim 18, wherein mixing performance is influenced by coordinated selection of toroidal geometry, mass distribution, and surface topology relative to fluid viscosity and container geometry.

* * * * *